US006856609B2

(12) United States Patent
Kusaka et al.

(10) Patent No.: US 6,856,609 B2
(45) Date of Patent: Feb. 15, 2005

(54) MOBILE STATION FOR CDMA COMMUNICATION SYSTEM AND METHOD FOR COMMUNICATION OF THE MOBILE STATION

(75) Inventors: Hiroyuki Kusaka, Takatsuki (JP); Michiyuki Yamaoka, Katano (JP); Masahide Akao, Kyotanabe (JP)

(73) Assignee: Sanyo Electric Co., Ltd., Osaka (JP)

( * ) Notice: Subject to any disclaimer, the term of this patent is extended or adjusted under 35 U.S.C. 154(b) by 857 days.

(21) Appl. No.: 09/817,178

(22) Filed: Mar. 27, 2001

(65) Prior Publication Data

US 2001/0026542 A1 Oct. 4, 2001

(30) Foreign Application Priority Data

Mar. 29, 2000 (JP) ........................................ 2000-092291

(51) Int. Cl.[7] ................................................. H04Q 7/00
(52) U.S. Cl. ...................... 370/331; 370/335; 370/342; 375/130; 455/436
(58) Field of Search ................................ 370/337, 331, 370/345, 342, 343, 443, 355, 329, 265; 399/60; 455/33.2, 436, 437, 313, 456, 460, 422, 442, 560; 375/130

(56) References Cited

U.S. PATENT DOCUMENTS

| 4,907,224 | A | * | 3/1990 | Scoles et al. | 370/443 |
|---|---|---|---|---|---|
| 5,345,467 | A | * | 9/1994 | Lomp et al. | 370/331 |
| 5,640,414 | A | * | 6/1997 | Blakeney et al. | 375/130 |
| 5,987,012 | A | | 11/1999 | Bruckert et al. | |
| 6,021,125 | A | * | 2/2000 | Sakoda et al. | 370/345 |
| 6,081,714 | A | * | 6/2000 | Wakizaka | 455/437 |
| 6,157,833 | A | * | 12/2000 | Lawson-Jenkins et al. | 455/436 |
| 6,289,007 | B1 | * | 9/2001 | Kim et al. | 370/331 |
| 6,456,606 | B1 | * | 9/2002 | Terasawa | 370/331 |
| 6,590,879 | B1 | * | 7/2003 | Huang et al. | 370/331 |

FOREIGN PATENT DOCUMENTS

JP 10-191428 7/1998

OTHER PUBLICATIONS

McGuire, M. et al; A robust fuzzy logic handoff algorithm, May 1997, IEEE 1997 Canadian Conference, vol. 1, pp.:796–799.*

Kinbshita Y, et al; Advanced handoff control using fuzzy inference for indoor radio systems, 1992 Vehicular Technology Conference, IEEE 42$^{nd}$, May 10–13, vol. 2, pp.: 649–653.*

Savkoor, N. et al; Microcellular handoff control using robust prediction techniques, Mar. 25–28, 1999, Southeaston '99, Proceedings, IEEE, pp.: 337–339.*

"Mobile Station–Base Station Compatibility Standard for Dual–Mode Wideband Spread Spectrum Cellular System," TIA/EIA Interim Standard, TIA/EIA/IS–95–A, May 1995, Telecommunications Industry Association.

* cited by examiner

*Primary Examiner*—Chi Pham
*Assistant Examiner*—Prenell Jones
(74) *Attorney, Agent, or Firm*—Arent Fox PLLC

(57) ABSTRACT

If the strength of the signal transmitted from a remaining base station is larger than that from the active base station, the search control unit 103 shifts to the confirmation mode, where the remaining base station is designated as a confirmation target remaining base station. Then, if the strength of the signal transmitted from the confirmation target remaining base station is larger than that from the active base station, a counter is incremented. If the counter value becomes a predetermined value R, a hand-off is performed to the remaining base station. In case that the strength of the signal transmitted from the confirmation target remaining base station becomes not larger than that from the active base station, the confirmation mode is terminated at that point to return to the normal mode.

17 Claims, 4 Drawing Sheets

FIG. 2

| ACTIVE BASE STATION | NEIGHBOR BASE STATIONS | R INC (REMAINING SEARCH INTERVAL NUMBER) |
|---|---|---|
| 7 | 2, 8, 10, 12, 14 | 5 |

…

MOBILE STATION FOR CDMA COMMUNICATION SYSTEM AND METHOD FOR COMMUNICATION OF THE MOBILE STATION

BACKGROUND OF THE INVENTION (1) Field of the Invention

The present invention relates to a mobile station for a Code Division Multiple Access (CDMA) communication system and a method for communication of the mobile station.

(2) Description of the Related Art

Recently, Code Division Multiple Access (CDMA) systems have been widely used in cellular phone systems. In the CDMA system, a transmitting station spread modulates a signal using special codes of pseudorandom noise (PN) sequence to transmit via broadband spectrum spread, while a receiving station reconstructs required signals by reverse-spread modulated using the same PN codes as those on the transmission side. Here, this PN sequence has a property of orthogonality whereby the cross-correlation value with the other sequence becomes zero. Due to the property of PN sequences, even when a plurality of transmission stations transmit spread modulated signals using different PN sequences, a receiving station can separate and extract signals only from desired transmission station using the same PN sequence used in the required transmission station.

The following are the methods for switching over to another base station with which to communicate. Firstly, base stations spread modulate and transmit pilot signals (control signals) using the PN sequence specific to each base station and which the mobile station uses for searching for a communication target. The offset values of the PN sequence are called PN numbers and range from 0 to 511. Since each base station can be identified with this PN number, the base station using the PN series whose PN number (offset value) is n is called a "base station n." The communicating base station is called an "active base station." The active base station transmits a neighbor list to the mobile station, the list indicating the numbers of the base stations located near the active base station. Each base station included in the neighbor list is called a "neighbor base station". Other base stations, other than the active base station and the neighbor base stations, and located far from them are called "remaining base stations." The active base station also transmits a remaining search interval number (R_INC) which indicates an interval between PN numbers of remaining base station to be searched and which the mobile station uses for searching a communication target.

The mobile station, during communication, always searches for a better base station than the currently active base station. That is, the mobile station measures strengths of signals transmitted from remaining base stations whose PN numbers apply to each R_INC, and from all neighbor base stations. Then, if any base station whose signal strength is larger than that from the active base station is detected, the mobile station hands off to the detected base station. Therefore, naturally the mobile station may hand off to one of the remaining base stations.

However, in case of a hand-off to remaining base stations, there are the following disadvantages.

The first disadvantage is that signals from the mobile station (i.e., reverse signals) have trouble reaching remaining base stations, because remaining base stations usually are located far from the mobile station. This is because, unlike base stations, the mobile station cannot transmit a signal having large energy value. Therefore, even if a hand-off is performed to one of the remaining base stations, communications may not be established between the remaining base station and the mobile station. Alternatively, even if such communications can be established, the communication quality may substantially be bad.

The second disadvantage is as follows: that is, in case of a hand-off to one of the remaining base station located far from the mobile station, the remaining base station becomes an active base station, thereby the neighbor base stations near then active base station also become remote base stations. In this case, since the base stations near the current location of the mobile station become remaining base stations, such base stations will not always become a target for the next search, because remaining base stations are searched skipping some stations according to the R_INC. As a result of that, though the strength of the signal transmitted from the base stations near the mobile station is usually larger than that from remote base stations, a hand-off to these near base stations becomes difficult.

There are many disadvantages in case of a hand-off to remaining base stations as above, so it is desirable to avoid the hand-off to remaining base stations as much as possible.

Meanwhile, as the mobile station moves, phasing may occur, where the propagation condition of radio waves changes and the strength of received signals fluctuates. Especially, remaining base stations are located far from the mobile station and their signals pass through various propagation conditions, so that their signal strengths are susceptible to time fluctuation. Consequently, the strength of signals from remaining base stations may be larger at the measuring time only. Thus, there is no guarantee that it is continuously larger at times other than the measuring time.

In the conventional hand-off methods to base stations, however, once the strength of the signal transmitted from one of the remaining base stations is detected to be larger than that from the active base station, then the mobile station hands off to the remaining base station regardless of whether the signals strength from the remaining base station is continuously larger at times other than that measuring time or not.

SUMMARY OF THE INVENTION

The object of the present invention is to provide a mobile station for a CDMA communication system so as to avoid a hand-off to a remaining base station whose signal strength is not continuously large.

(1) In order to achieve this object, a mobile station for a CDMA communication system of the present invention is made up of: a detecting means for detecting strengths of signals transmitted from a plurality of base stations; a finding means for finding a first base station transmitting a signal having a larger signal strength than a signal from a second base station with which the mobile station is currently in communication; a judging means for judging whether the found base station by the finding means is one of neighbor base stations located in the vicinity of the second base station or one of remaining base stations other than the neighbor base stations; and a hand-off control means for, if the found base station is one of the remaining base stations, designating the remaining base station as a confirmation target remaining base station and temporarily suspending a hand-off to the confirmation target remaining base station. Thereby, a hand-off to a remaining base station whose signal strength is not continuously large can be avoided. That is, in the present invention, when a strength of a signal transmitted from a remaining base station is detected to be larger than that from the currently communicating base station, the mobile station does not hand off to the remaining base station immediately.

(2) In above (1), the hand-off control means makes the detecting means repeatedly detect a strength of a signal transmitted from the confirmation target remaining base station, while suspending the hand-off temporarily, and cancels the suspension so that the hand-off is performed to the confirmation target remaining base station, if a number of times when the strength of the signal transmitted from the confirmation target remaining base station is consecutively larger than the strength of the signal transmitted from the second base station reaches a predetermined number. This enables a hand-off to be performed to an appropriate base station, because the mobile station hands off to a confirmation target remaining base station if the strength of the signal transmitted from the confirmation target remaining base station is larger than that from the currently communicating base station, all predetermined number of times.

(3) In above (2), the hand-off control means further makes the detecting means detect strengths of the signals transmitted from the neighbor base stations during intervals between each detection of the strength of the signal transmitted from the confirmation target remaining base station, and if a strength of a signal transmitted from one of the neighbor base stations is larger than the strength of the signal transmitted from the second base station, the hand-off control means hands off to the neighbor base station. This enables to a hand-off to be performed to a base station that is a more appropriate than remaining base stations as a hand-off target, because if a more appropriate neighbor base station is detected while the mobile station is confirming whether the strength of the signal transmitted from the confirmation target remaining base station is continuously larger or not, a hand-off is performed to the neighbor base station.

(4) In above (3), the hand-off control means controls the detecting means so that a frequency of detecting the strengths of the signals transmitted from the neighbor base stations is higher than a frequency of detecting the strength of the signal transmitted from the confirmation target remaining base station. Thereby, even if the signal propagation condition is fluctuating in the area where a group of neighbor base stations is located, a neighbor base station whose propagation condition becomes better can be detected promptly and then a hand-off can be performed to the neighbor base station, because the strength of the signal transmitted from the neighbor base stations is detected frequently.

(5) In above (4), the hand-off control means, if a hand-off is performed to one of the neighbor base stations, controls the detecting means so that detection of the strength of the signal transmitted from the confirmation target remaining base station is antecedent to detection of strengths of signals transmitted from other remaining base stations. Thereby, since the confirmation target remaining base station, where the confirmation process is being conducted whether the signal strength is continuously larger or not while suspending a hand-off, has a high probability to be handed off in the future, a hand-off target can be searched promptly by moving the order of detection of the strength of the signal transmitted from the confirmation target remaining base station forward.

(6) In addition, in above (1), the hand-off control means makes the detecting means detect a strength of a signal transmitted from the confirmation target remaining base station a predetermined number of times, while suspending the hand-off temporarily, and cancels the suspension so that the hand-off is performed to the confirmation target remaining base station if a mean value of strengths of the signals transmitted from the confirmation target remaining base station detected by the detecting means the predetermined number of times is larger than the strength of the signal transmitted from the second base station. This enables a hand-off to be performed to an appropriate base station, because, when the mean value of the strengths of the signals transmitted from the confirmation target remaining base station which are detected a predetermined number of times is larger than that of the currently communicating base station, the mobile station hands off to the confirmation target remaining base station.

(7) Moreover, in above (1), the hand-off control means makes the detecting means detect a strength of a signal transmitted from the confirmation target remaining base station a predetermined number of times, while suspending the hand-off temporarily, and cancels the suspension so that the hand-off is performed to the confirmation target remaining base station if a ratio of a number of times when the strength of the signal transmitted from the confirmation target remaining base station is larger than the strength of the signal transmitted from the second base station to the predetermined number of times is a predetermined ratio or higher. This enables a hand-off to be performed to an appropriate base station, because, when the ratio of a number of times when the strength of the signal transmitted from the confirmation target remaining base station is larger than the strength of the signal transmitted from the second base station to the predetermined number of times is a predetermined ratio or higher, the mobile station hands off to the confirmation target remaining base station.

As stated above, the present invention resolves the significant problem in the CDMA mobile communication system that the mobile station communicates with inappropriate base stations. Therefore, it has considerable practical effects.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 shows an example of a set of search information;

DESCRIPTION OF THE PREFERRED EMBODIMENT

The following describes a preferred embodiment of the present invention using the drawings.

Construction of a Mobile Station

Figure 1:
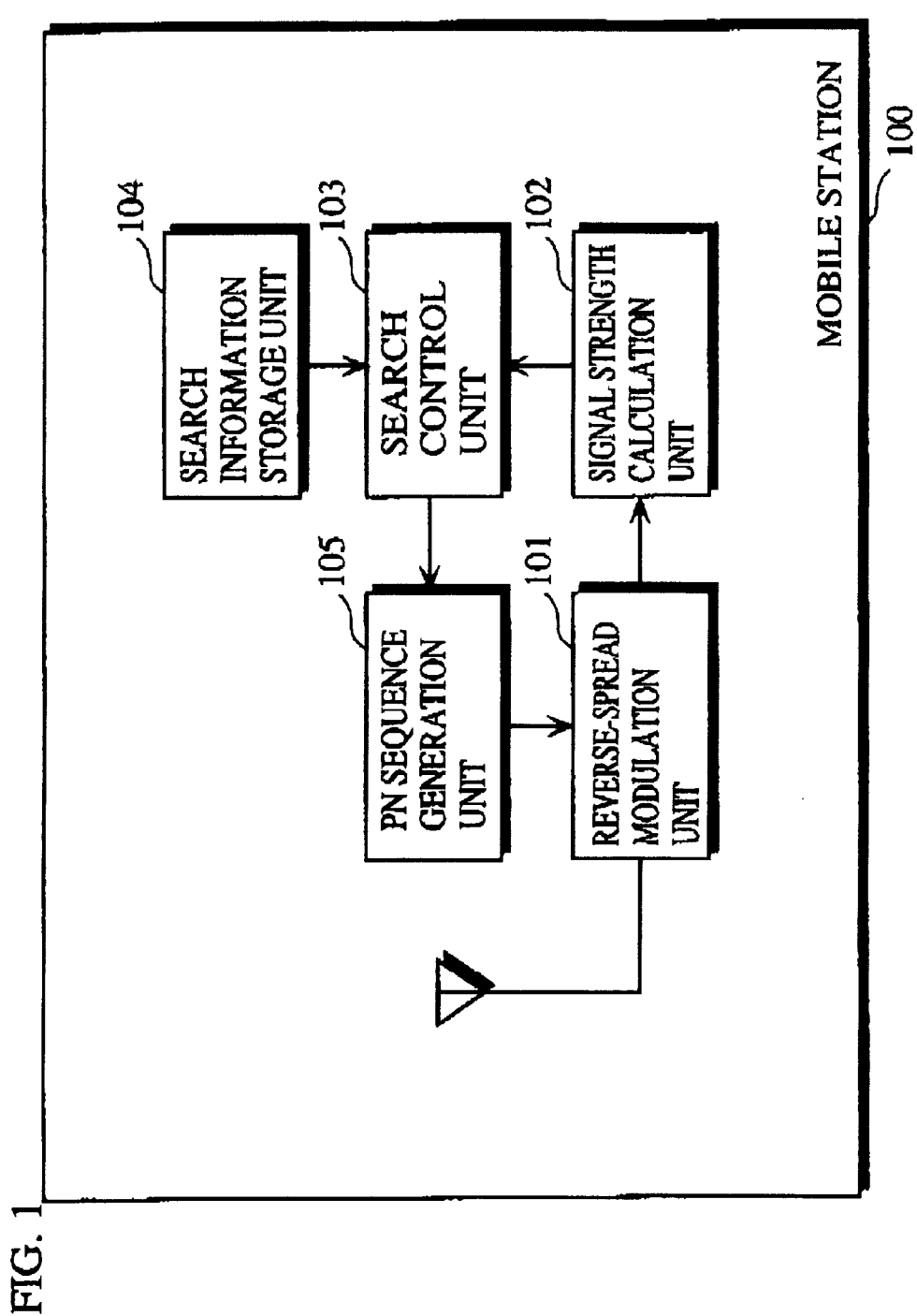
FIG. 1 is a block diagram showing the construction of a mobile station in the CDMA communication system that is a preferred embodiment of the present invention.

FIG. 1 is a block diagram showing the construction of a mobile station in the CDMA communication system that is a preferred embodiment of the present invention. As shown in FIG. 1, a mobile station 100 in the CDMA communication system consists of a reverse-spread modulation unit 101, a signal strength calculation unit 102, a search control unit 103, a search information storage unit 104, and a PN sequence generation unit 105.

The search information storage unit 104 stores a set of search information comprising a currently communicating base station number, a list (hereafter called a neighbor list) of neighbor base stations' numbers, and a remaining search interval number R_INC. Here, the neighbor list and the R_INC are transmitted from the active base station so that the search information storage unit 104 can receive and store them. FIG. 2 shows an example of a set of search information. As shown in FIG. 2, the active base station is the base station 7, the neighbor base stations are base stations 2, 8, 10, 12, and 14, and the interval number for searching remaining base stations (i.e., R_INC) is 5.

When the search control unit 103 specifies a base station number, the PN sequence generation unit 105 generates a PN sequence (spread codes) having the number as its offset value and transmits the same to the reverse-spread modulation unit 101.

The reverse-spread modulation unit 101 reverse-spread modulates received signals using the PN sequence transmitted from the PN sequence generation unit 105 to extract a pilot signal from the base station at which the signal is spread and modulated with the PN sequence.

The signal strength calculation unit 102 calculates a strength of the pilot signal of each base station transmitted from the reverse-spread modulation unit 101. Specifically, this unit calculates a value of Ec/Io as a signal strength, obtained by dividing a signal energy of each base station Ec by total energy of signals Io.

The search control unit 103 is the most distinctive element of a preferred embodiment of the present invention. This unit refers to the search information storage unit 104 to identify a base station to be searched, and then transmits the base station number to the PN sequence generation unit 105.

The search control unit 103 conducts a search according to the following sequence (A1).
(A1) The search control unit 103 repeats a search, where one cycle consists of searches for the active base station, all neighbor base stations, and remaining base stations selected with R_INC, in this order.

For example, assuming that the active base station is the base station 7, the neighbor base stations are base stations {2, 8, 10, 12, 14}, and the R_INC is 5 as shown in FIG. 2, the search is conducted in the order of {7, 2, 8, 10, 12, 14, 0},{7, 2, 8, 10, 12, 14, 5},{7, 2, 8, 10, 12, 14, 15}, and so on. Here, in the third cycle, since the base station 10 is a neighbor base station, the base station 15 superadded with R_INC (=5) is selected to avoid duplication of search.

Next, the search control unit 103 decides a hand-off between base stations according to the following criterion (B1) or (B2).
(B1) In case that the maximum value of the strength of the signal transmitted from one of the neighbor base stations is larger than that from the active base station, a hand-off to the neighbor base station is performed promptly. Hence, even though the signal strength is larger only at the measuring time but is usually small, the mobile station hands off to the neighbor station promptly. After that, however, if the measured value of the base station to which the hand-off was performed becomes smaller than that of another base station, the mobile station hands off to the other base station, thereby a more appropriate base station can be selected. Therefore, a hand-off to neighbor base stations is performed immediately unlike to remaining base stations which will be described later, even if whose signal strength becomes larger at only one time. This is because even when the mobile station hands off to a neighbor station whose signal strength is not continuously large, its disadvantage is small.
(B2) In case that the strength of the signal transmitted from one of the remaining base stations is larger than that from the active base station, the search control unit 103 shifts to the confirmation mode where the remaining base station is designated as a confirmation target.

That is, in order to avoid a hand-off to inappropriate base stations as much as possible, when the strength of the signal transmitted from a remaining base station becomes larger at one time, the search control unit does not promptly hand off to the remaining base station, but shifts to the confirmation mode where the strength of the signal transmitted from the remaining base station is repeatedly confirmed. Hereafter, the condition before shifting to the confirmation mode will be called a normal mode to distinguish from the confirmation mode.

The following describes the search method in the confirmation mode.

In the confirmation mode, the search control unit 103 conducts a search according to the following sequence (C1).
(C1) After repeating a search of the active base station and all neighbor base stations as one set N times, the search control unit 103 conducts a search for a confirmation target remaining base station. This is one cycle of the search and this search is repeated a predetermined number of cycles. For example, assuming that the active base station is the base station 7, the neighbor base stations are base stations {2, 8, 10, 12, 14}, the predetermined number N is 3, and the base station 15 becomes a confirmation target, the search is conducted in the order of {7, 2, 8, 10, 12, 14, 7, 2, 8, 10, 12, 14, 7, 2, 8, 10, 12, 14, 15} as one cycle and repeated the predetermined number of cycles.

In the confirmation mode, the search control unit 103 determines a hand-off between base stations according to the following criterion (D1) or (D2).
(D1) In case that the maximum value of strength of the signal transmitted from one of the neighbor base station is larger than that of the active base station, the search control unit 103 performs a hand-off to the neighbor base station.

That is, also in the confirmation mode, if a neighbor base station whose signal strength is larger is detected, the search control unit performs a hand-off to the neighbor base station.
(D2) In case that the strength of the signal transmitted from the confirmation target remaining base station is larger than that of the active base station a predetermined number of times in a row, the search control unit 103 performs a hand-off to the remaining base station. During the confirmation process, if the strength of the signal transmitted from the confirmation target remaining base station becomes not larger than that of the active base station, the search control unit 103 terminates the confirmation mode at that time, and returns to the normal mode.

That is, besides the strength of the signal transmitted from remaining base stations being likely to fluctuate, there are many disadvantages in case of a hand-off to the remaining base stations. Therefore, only when the signal strength is ensured to be continuously large, a hand off is performed to the remaining base station.

Search Operation in the Normal Mode

The following describes a search operation in the normal mode in a mobile station of a preferred embodiment of the present invention.

Figure 3:
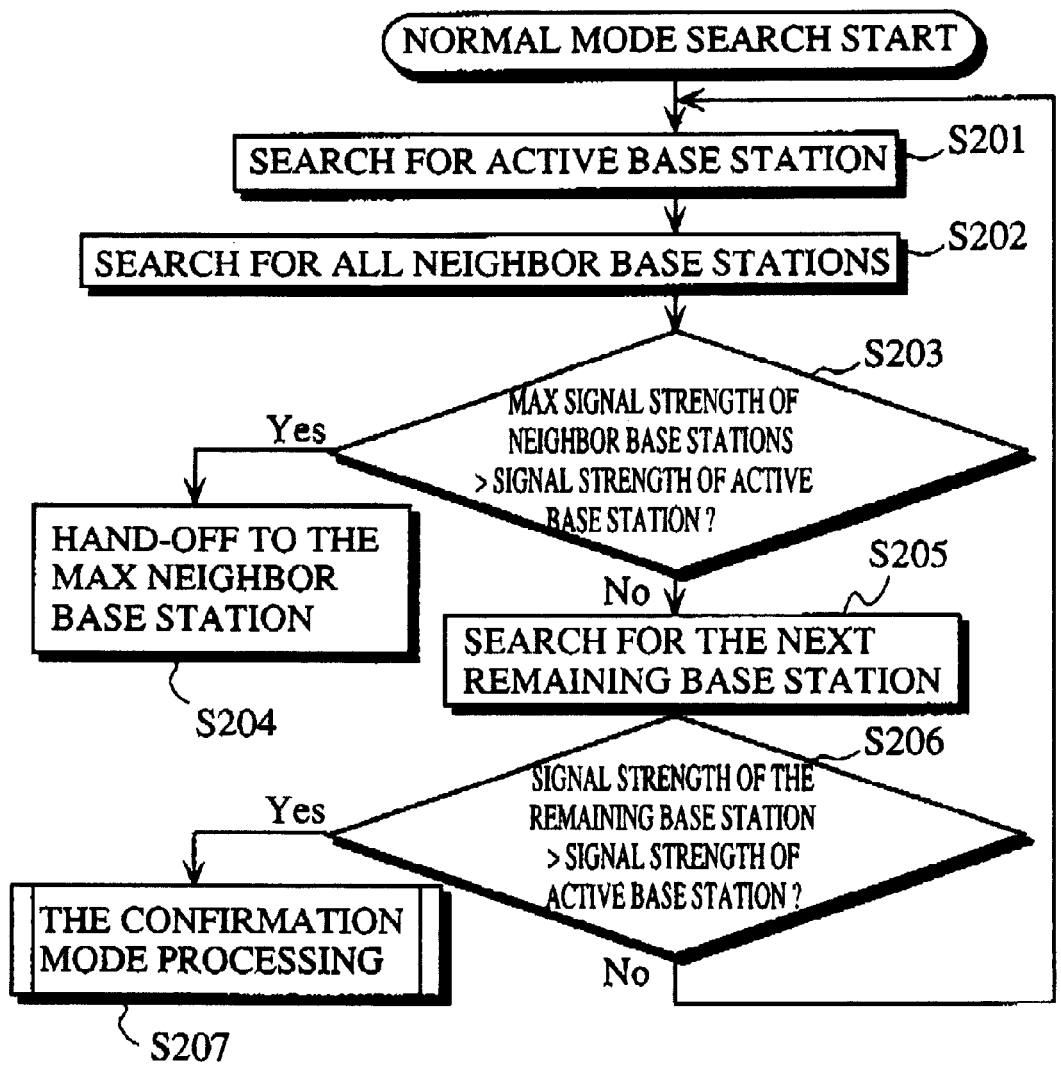
FIG. 3 is a flowchart showing the operating procedure of searching in the normal mode.

FIG. 3 is a flowchart showing the operating procedure of searching in the normal mode.

Firstly, the search control unit 103 refers to the search information storage unit 104 to identify a base station to be selected as an active base station, makes the reverse-spread modulation unit 101 extract the signal of the active base station by generating the PN sequence of the active base station, and obtains the strength of the signal transmitted from the active base station from the signal strength calculation unit 102 (Step S201).

Next, the search control unit 103 refers to the search information storage unit 104 to identify base stations to be selected as neighbor base stations, and obtains all strengths of signals transmitted from the neighbor base stations in the same way as the active base station (Step S202).

In case that the maximum value of the strength of the signal transmitted from the neighbor base stations is larger than that from the active base station, the search control unit 103 hands off to the neighbor base station producing the maximum signal strength (Steps S203 and S204).

On the other hand, in case that the maximum value of the strength of the signal transmitted from the neighbor base stations is not larger than that of the active base station, the search control unit 103 conducts a search for one remaining base station. That is, the search control unit 103 refers to the search information storage unit 104 to select any one base station (remaining base station) other than the active and neighbor base stations, and obtains the signal strength of the selected base station (Step S205).

If the strength of the signal transmitted from the remaining base station is larger than that of the active base station, then the search control unit 103 shifts to the confirmation mode where the remaining base station is designated as a confirmation target remaining base station (Steps S206 and S207).

On the other hand, in case that the maximum value of the signal is not larger than that of the active base station, the search control unit 103 returns to the Step S201 to repeat the process (Step S206).

In the following Step S205, the search control unit 103 identifies the base station whose number is the number obtained by adding a remaining search interval number (R_INC) stored in the search information storage unit 104 to the last selected remaining base station number. Then, if the base station is neither the active base station nor neighbor base stations (i.e., a remaining base station), a search is conducted for the remaining base station. If the base station is not a remaining base station, a remaining base station to be searched is decided by investigating whether the base station, whose number is the number obtained by superadding a remaining search interval number, is a remaining base station or not, and a search is conducted for the remaining base station.

Search Operation in the Confirmation Mode

The following describes a search operation in the confirmation mode in a mobile station of a preferred embodiment of the present invention.

Figure 4:
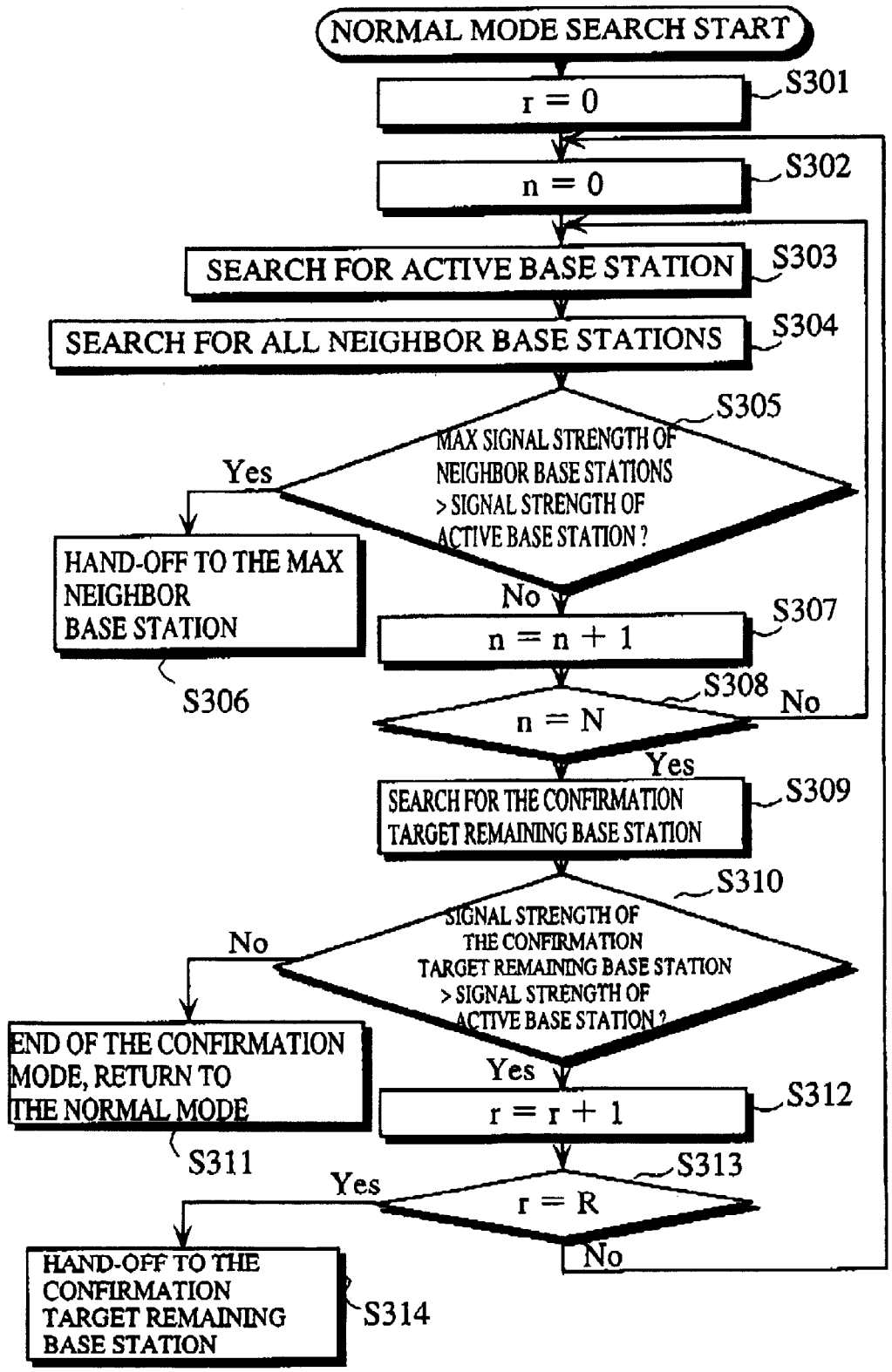
FIG. 4 is a flowchart showing the operating procedure of searching in the confirmation mode.

FIG. 4 is a flowchart showing the operation procedure of searching in the normal mode.

Firstly, the search control unit 103 sets value r, which indicates the number of times the confirmation target remaining base station is confirmed (i.e., the number of times the signal strength thereof is larger than that of the active base station), to 0, and sets value n, which indicates the number of times of searching neighbor base stations, to 0 (Steps S301 and S302).

Secondly, the search control unit 103 refers to the search information storage unit 104 to identify a base station to be selected as an active base station, makes the reverse-spread modulation unit 101 extract the signal from the active base station by generating the PN sequence of the active base station, and obtains the strength of the signal transmitted from the active base station from the signal strength calculation unit 102 (Step S303).

Next, the search control unit 103 refers to the search information storage unit 104 to identify all base stations to be selected as neighbor base stations, and obtains all strengths of signals transmitted from the neighbor base stations in the same way as the active base station (Step S304).

In case that the maximum value of the strengths of signals transmitted from the neighbor base stations is larger than that from the active base station, the search control unit 103 hands off to the neighbor base station producing the maximum signal strength (Steps S305 and S306).

On the other hand, in case that the maximum value of the strengths of signals transmitted from the neighbor base stations is not larger than that from the active base station, the search control unit 103 increments the value n which indicates the number of times of searching the neighbor base stations (Step S307).

If the value n is smaller than N which indicates the number of times to be searched, then the search control unit 103 returns to the Step S303 to repeat the search of the active and neighbor base station (Steps S308 and S303).

On the other hand, if the value of the n becomes equal to N which indicates the number of times to be searched, then the search control unit 103 conducts a search for the confirmation target remaining base station. That is, the search control unit 103 obtains the strength of the signal transmitted from the confirmation target remaining base station in the same way as the active base station (Step S309)

In case that the strength of the signal transmitted from the confirmation target remaining base station is not larger than that of the active base station, the search control unit 103 terminates the confirmation mode and shifts to the normal mode to follow the Steps S201 or below in the normal mode as in FIG. 3 (Steps S310 and S311).

On the other hand, in case that the strength of the signal transmitted from the confirmation target remaining base station is larger than that of the active base station, the search control unit 103 increments the value r which indicates the number of times the confirmation target remaining base station is confirmed (Step S312).

If the value of the r is smaller than a predetermined times R, the search control unit 103 returns to the Step S302 and repeats the Steps S303 (i.e., a search of the active base station) or below (Steps S313 and S302). active base station) or below (Steps S313 and S302).

On the other hand, when the value r becomes equal to the predetermined value R, the search control unit 103 hands off to the confirmation target remaining base station (Steps S313 and S314).

Summary

As described above, in the mobile station for a CDMA communication system in a preferred embodiment of the present invention, a hand-off to a remaining base station is not promptly performed even if signal strength is larger than that of the active base station, but the same is performed only when the signal strength detected a prescribed number of times is always larger than that of the active base station. Therefore, a hand-off to a remaining base station, whose signal strength is larger only at one time by chance and not larger continuously, is avoided.

Modifications (1) Confirmation Methods:

In a preferred embodiment of the present invention, a hand-off to a remaining base station is performed on the condition that the strength of the signal transmitted from the remaining base station is larger than that of the active base station all of the predetermined number of times. The present invention, however, is not limited to this embodiment. For example, a hand-off to a remaining base station may be performed if the mean value of signal strength of signals measured a prescribed number of times becomes larger than that of the active base station. Alternatively, the hand-off may be performed if some values of signal strength of signals measured a predetermined number of times are larger than that of the active base station.

(2) In the Confirmation Mode:

In a preferred embodiment of the present invention, after a hand-off is performed to a neighbor base station in the confirmation mode, the fact that the confirmation target remaining base station was confirmed the last time is not taken into account in the next search. The present invention, however, is not limited to this embodiment. For example, when a hand-off is performed to a neighbor base station in the confirmation mode, a search may be conducted starting from the remaining base station which was the confirmation target in the last time, in the following search for remaining base stations.

Alternatively, a search may be continued only for the remaining base station which was the confirmation target the last time.

In addition, when the same remaining base station as in the last time is selected as a confirmation target after a hand-off is performed to a neighbor base station in the confirmation mode, the counter value the last time may be used as the initial value of the counter. For example if the number of times of confirmation was 10, the initial value of the counter may be set to 10.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mobile station for a CDMA communication system comprising:
   a detecting means for detecting strengths of signals transmitted from a plurality of base stations;
   a finding means for finding a first base station transmitting a signal having a larger signal strength than a signal from a second base station with which the mobile station is currently in communication;
   a judging means for judging whether the found base station by the finding means is one of neighbor base stations located in the vicinity of the second base station or one of remaining base stations other than the neighbor base stations; and
   a hand-off control means for, if the found base station is one of the remaining base stations, designating the remaining base station as a confirmation target remaining base station and temporarily suspending a hand-off to the confirmation target remaining base station.

2. The mobile station for the CDMA communication system according to claim 1,
   wherein the hand-off control means makes the detecting means repeatedly detect a strength of a signal transmitted from the confirmation target remaining base station, while suspending the hand-off temporarily, and cancels the suspension so that the hand-off is performed to the confirmation target remaining base station, if a number of times when the strength of the signal transmitted from the confirmation target remaining base station is consecutively larger than the strength of the signal transmitted from the second base station reaches a predetermined number.

3. The mobile station for the CDMA communication system according to claim 2,
   wherein the hand-off control means further makes the detecting means detect strengths of the signals transmitted from the neighbor base stations during intervals between each detection of the strength of the signal transmitted from the confirmation target remaining base station, and if a strength of a signal transmitted from one of the neighbor base stations is larger than the strength of the signal transmitted from the second base station, the hand-off control means hands off to the neighbor base station.

4. The mobile station for the CDMA communication system according to claim 3,
   wherein the hand-off control means controls the detecting means so that a frequency of detecting the strengths of the signals transmitted from the neighbor base stations is higher than a frequency of detecting the strength of the signal transmitted from the confirmation target remaining base station.

5. The mobile station for the CDMA communication system according to claim 4,
   wherein the hand-off control means, if a hand-off is performed to one of the neighbor base stations, controls the detecting means so that detection of the strength of the signal transmitted from the confirmation target remaining base station is antecedent to detection of strengths of signals transmitted from other remaining base stations.

6. The mobile station for the CDMA communication system according to claim 1,
   wherein the hand-off control means makes the detecting means detect a strength of a signal transmitted from the confirmation target remaining base station a predetermined number of times, while suspending the hand-off temporarily, and cancels the suspension so that the hand-off is performed to the confirmation target remaining base station if a mean value of strengths of the signals transmitted from the confirmation target remaining base station detected by the detecting means the predetermined number of times is larger than the strength of the signal transmitted from the second base station.

7. The mobile station for the CDMA communication system according to claim 6,
   wherein the hand-off control means further makes the detecting means detect strengths of the signals transmitted from the neighbor base stations during intervals between each detection of the strength of the signal transmitted from the confirmation target remaining base station, and if a strength of a signal transmitted from one of the neighbor base stations is larger than the strength of the signal transmitted from the second base station, the hand-off control means hands off to the neighbor base station.

8. The mobile station for the CDMA communication system according to claim 7,
wherein the hand-off control means controls the detecting means so that a frequency of detecting the strengths of the signals transmitted from the neighbor base stations is higher than a frequency of detecting the strength of the signal transmitted from the confirmation target remaining base station.

9. The mobile station for the CDMA communication system according to claim 8,
wherein the hand-off control means, if a hand-off is performed to one of the neighbor base stations, controls the detecting means so that detection of the strength of the signal transmitted from the confirmation target remaining base station is antecedent to detection of strengths of signals transmitted from other remaining base stations.

10. The mobile station for the CDMA communication system according to claim 1,
wherein the hand-off control means makes the detecting means detect a strength of a signal transmitted from the confirmation target remaining base station a predetermined number of times, while suspending the hand-off temporarily, and cancels the suspension so that the hand-off is performed to the confirmation target remaining base station if a ratio of a number of times when the strength of the signal transmitted from the confirmation target remaining base station is larger than the strength of the signal transmitted from the second base station to the predetermined number of times is a predetermined ratio or higher.

11. The mobile station for the CDMA communication system according to claim 10,
wherein the hand-off control means further makes the detecting means detect strengths of the signals transmitted from the neighbor base stations during intervals between each detection of the strength of the signal transmitted from the confirmation target remaining base station, and if a strength of a signal transmitted from one of the neighbor base stations is larger than the strength of the signal transmitted from the second base station, the hand-off control means hands off to the neighbor base station.

12. The mobile station for the CDMA communication system according to claim 11,
wherein the hand-off control means controls the detecting means so that a frequency of detecting the strengths of the signals transmitted from the neighbor base stations is higher than a frequency of detecting the strength of the signal transmitted from the confirmation target remaining base station.

13. The mobile station for the CDMA communication system according to claim 12,
wherein the hand-off control means, if a hand-off is performed to one of the neighbor base stations, controls the detecting means so that detection of the strength of the signal transmitted from the confirmation target remaining base station is antecedent to detection of strengths of signals transmitted from other remaining base stations.

14. A method for communication used in a mobile station for a CDMA communication system comprising:
a detecting step for detecting strengths of signals transmitted from a plurality of base stations;
a finding step for finding a first base station transmitting a signal having a larger signal strength than a signal from a second base station with which the mobile station is currently in communication;
a judging step for judging whether the found base station in the finding step is one of neighbor base stations located in the vicinity of the second base station or one of remaining base stations other than the neighbor base stations; and
a hand-off control step for, if the found base station is one of the remaining base stations, designating the remaining base station as a confirmation target remaining base station and temporarily suspending a hand-off to the confirmation target remaining base station.

15. The method for communication of the mobile station for the CDMA communication system according to claim 14, comprising an additional step of:
detecting a strength of a signal transmitted from the confirmation target remaining base station repeatedly, while continuing the suspension of the hand-off temporarily after the hand-off control step and canceling the suspension so that the hand-off is performed to the confirmation target remaining base station if a number of times when the strength of the signal transmitted from the confirmation target remaining base station is consecutively larger than the second base station reaches a predetermined number.

16. The method for communication of the mobile station for the CDMA communication system according to claim 14, comprising an additional step of:
detecting a strength of a signal transmitted from the confirmation target remaining base station a predetermined number of times, while continuing the suspension of the hand-off temporarily after the hand-off control step and canceling the suspension so that the hand-off is performed to the confirmation target remaining base station if a mean value of strengths of signals transmitted from the confirmation target remaining base station detected the predetermined number of times is larger than the second base station.

17. The method for communication of the mobile station for the CDMA communication system according to claim 14, comprising the additional steps of:
detecting a strength of a signal transmitted from the confirmation target remaining base station a predetermined number of times, while continuing the suspension of the hand-off temporarily after the hand-off control step; and
canceling the suspension and performing the hand-off to the confirmation target remaining base station if a ratio of a number of times when the strength of the signal transmitted from the confirmation target remaining base station is larger than the strength of the signal transmitted from the second base station to the predetermined number of times is a predetermined ratio or higher.

* * * * *